(12) United States Patent
Chen

(10) Patent No.: US 6,826,039 B2
(45) Date of Patent: Nov. 30, 2004

(54) COMPUTER ENCLOSURE INCORPORATING SUPPORT FRAME FOR MOTHERBOARD

(75) Inventor: Yun-Lung Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 87 days.

(21) Appl. No.: 10/315,613

(22) Filed: Dec. 9, 2002

(65) Prior Publication Data

US 2004/0075974 A1 Apr. 22, 2004

(30) Foreign Application Priority Data

Oct. 22, 2002 (TW) ..................................... 91216857 U

(51) Int. Cl.[7] .................................................. G06F 1/16
(52) U.S. Cl. .................... 361/679; 361/686; 312/223.1; 312/223.2
(58) Field of Search ................................. 361/679, 683, 361/685, 686, 724, 725; 312/223.1, 223.2

(56) References Cited

U.S. PATENT DOCUMENTS 5,944,398 A * 8/1999 Wu ......................... 312/223.2
6,137,678 A * 10/2000 Gebara et al. .............. 361/685
6,373,697 B1 * 4/2002 Lajara et al. ............... 361/687
6,473,295 B2 * 10/2002 Chen ......................... 361/683
6,714,406 B2 * 3/2004 Chen ......................... 361/683

* cited by examiner

Primary Examiner—Lynn Feild
Assistant Examiner—Anthony Q. Edwards
(74) Attorney, Agent, or Firm—Wei Te Chung

(57) ABSTRACT

A computer enclosure includes a chassis (1) with a storage device bracket (50) secured therein, and a support frame (40) for securing a motherboard in the chassis. The chassis includes a bottom panel (10), a front panel (30), and a rear panel (20). An extension plate (34) extends rearwardly from the front panel. The support frame includes separately formed first and second support members (42, 44). The first support member includes a vertical plate (422) secured to the bottom panel and the extension plate, and a horizontal plate (424) secured to the bracket. The second support member is secured between the vertical plate and the rear panel. Protrusions (421) and standoffs (446) are formed on the vertical plate and the second support member respectively, for cooperatively supporting the motherboard thereon. Two openings (428, 432) are defined in the horizontal and vertical plates respectively, for dissipation of heat from the motherboard.

19 Claims, 6 Drawing Sheets

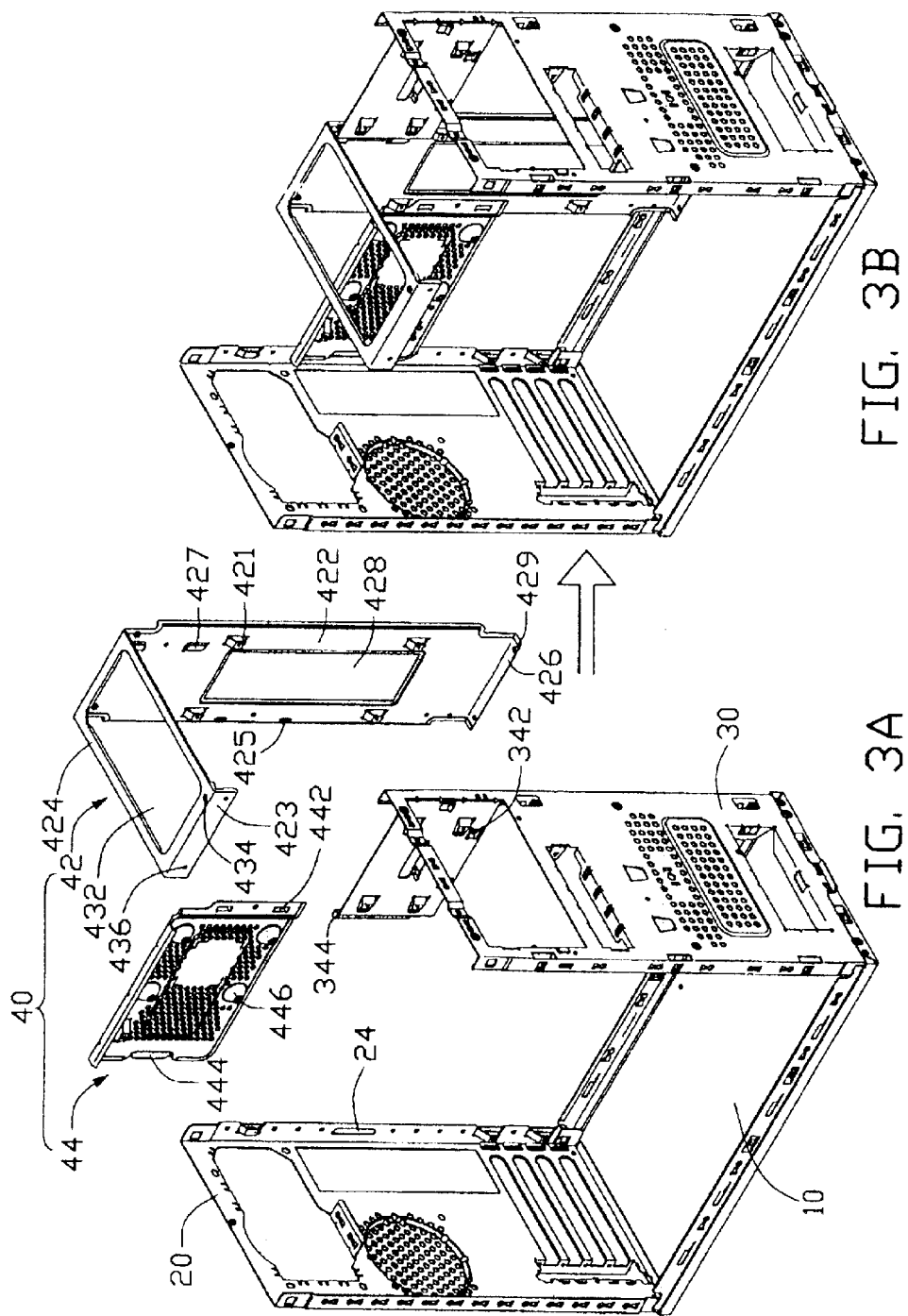

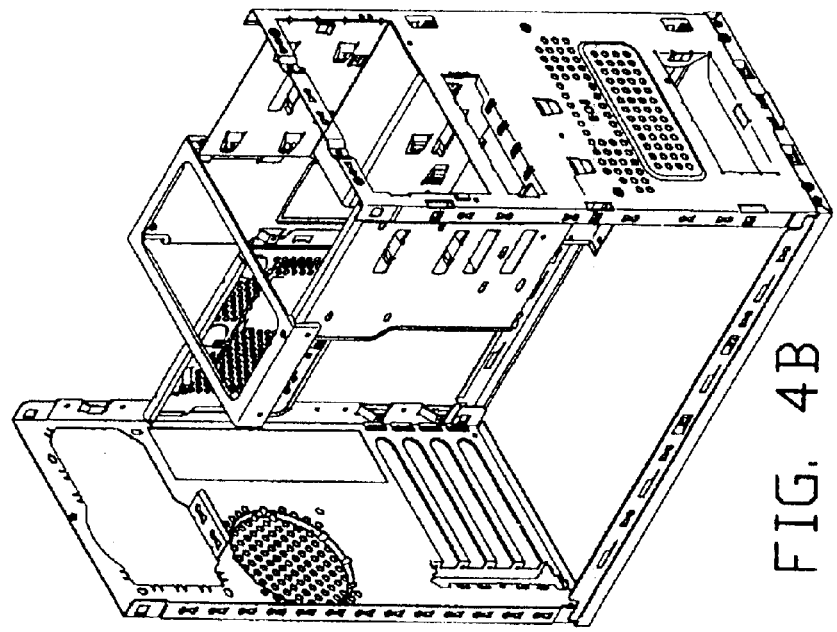
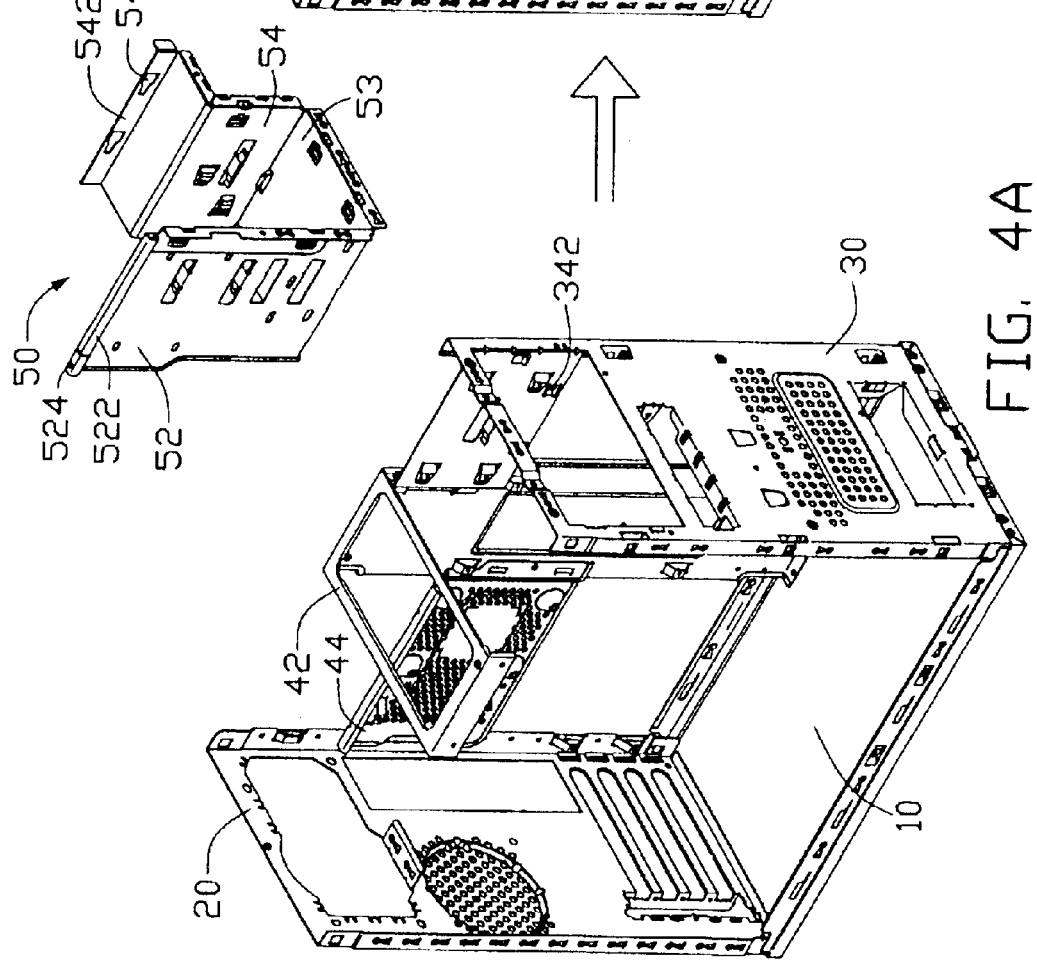
FIG. 4A
FIG. 4B

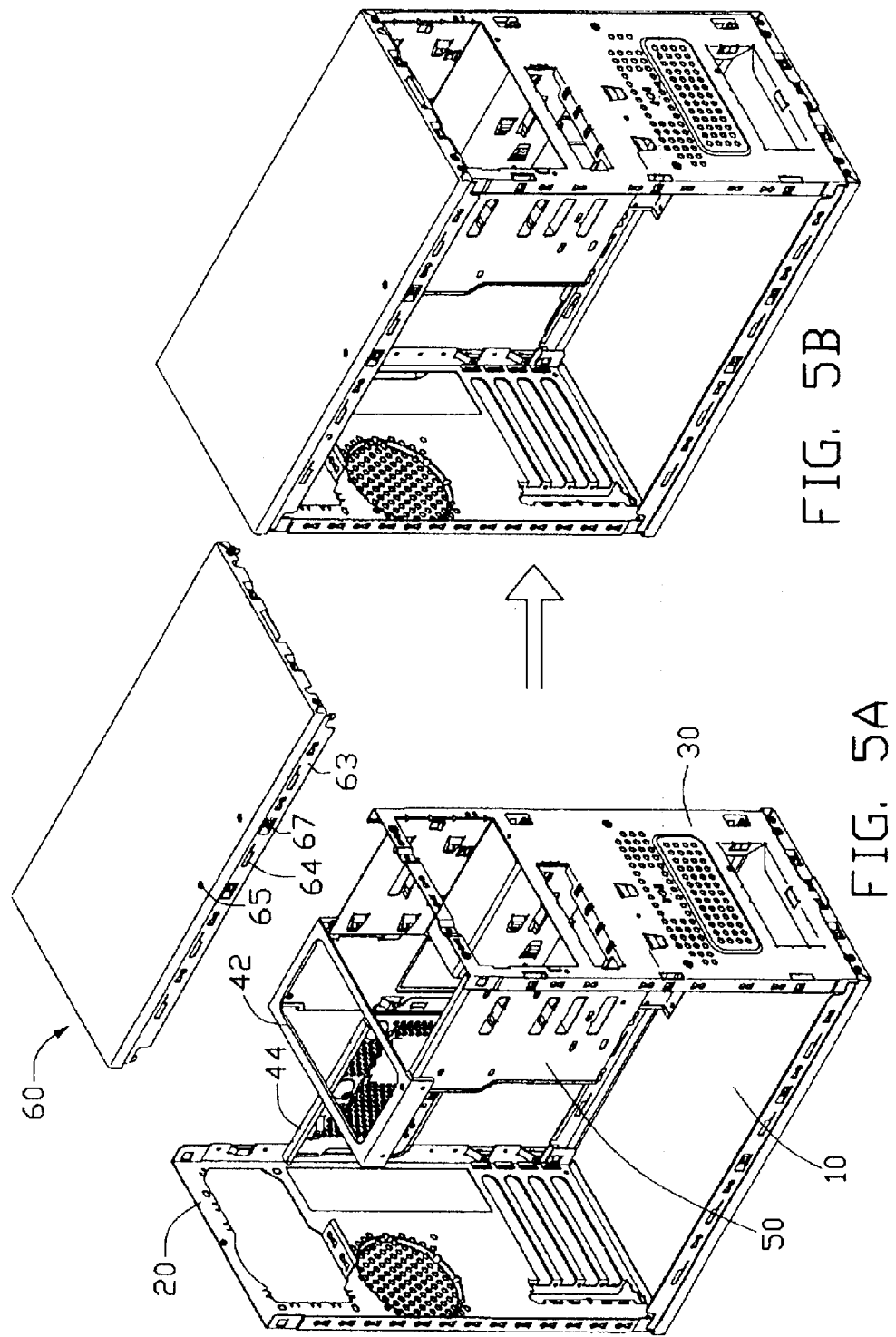

COMPUTER ENCLOSURE INCORPORATING SUPPORT FRAME FOR MOTHERBOARD

BACKGROUND OF THE INVENTION

1. Field of the Invention

The present invention relates to computer enclosures, and particularly to a computer enclosure having a support frame for a motherboard.

2. Related Art

In a computer system, a support frame is oftentimes used to support and secure a motherboard in a computer enclosure. A conventional support frame is integrally formed from a metal plate.

Taiwan Patent Application No. 87215729 discloses a conventional support frame for a motherboard. The support frame is integrally formed from a metal plate. A plurality of standoffs is formed on the support frame for supporting the motherboard thereon. The size of the support frame is about the same as the size of the motherboard.

However, with this kind of support frame, only the standoffs are used to support the motherboard. Most portions of the support frame are functionless. Manufacturing of the support frame requires an unduly large amount of material. Moreover, the support frame is an integral plate that blocks dissipation of heat from the motherboard. This makes the motherboard unduly prone to heat malfunction or damage.

SUMMARY OF THE INVENTION

Accordingly, an object of the present invention is to provide a computer enclosure having a support frame for a motherboard which is relatively inexpensive to manufacture.

Another object of the present invention is to provide a computer enclosure having a support frame for a motherboard which facilitates heat dissipation from the motherboard.

To achieve the above-mentioned objects, a computer enclosure in accordance with the present invention comprises a chassis with a storage device bracket secured therein, and a support frame for securing a motherboard in the chassis. The chassis comprises a bottom panel, a front panel, and a rear panel. An extension plate extends rearwardly from the front panel. The support frame comprises separately formed first and second support members. The first support member comprises a vertical plate secured to the bottom panel and the extension plate, and a horizontal plate supported on and secured to the storage device bracket. The second support member is secured between the vertical plate of the first support member and the rear panel. A plurality of protrusions and standoffs is formed on the vertical plate and the second support member respectively, for cooperatively supporting the motherboard thereon. A pair of openings is defined in the horizontal and vertical plates respectively, for facilitating dissipation of heat from the motherboard.

Other objects, advantages and novel features of the present invention will be drawn from the following detailed description of a preferred embodiment of the present invention with attached drawings, in which:

BRIEF DESCRIPTION OF THE DRAWINGS

FIGS. 3A-3B, 4A-4B, 5A-5B and 6A-6B show sequential stages in assembly of the computer enclosure of FIG. 1.

DESCRIPTION OF THE PREFERRED EMBODIMENT

Figure 1:
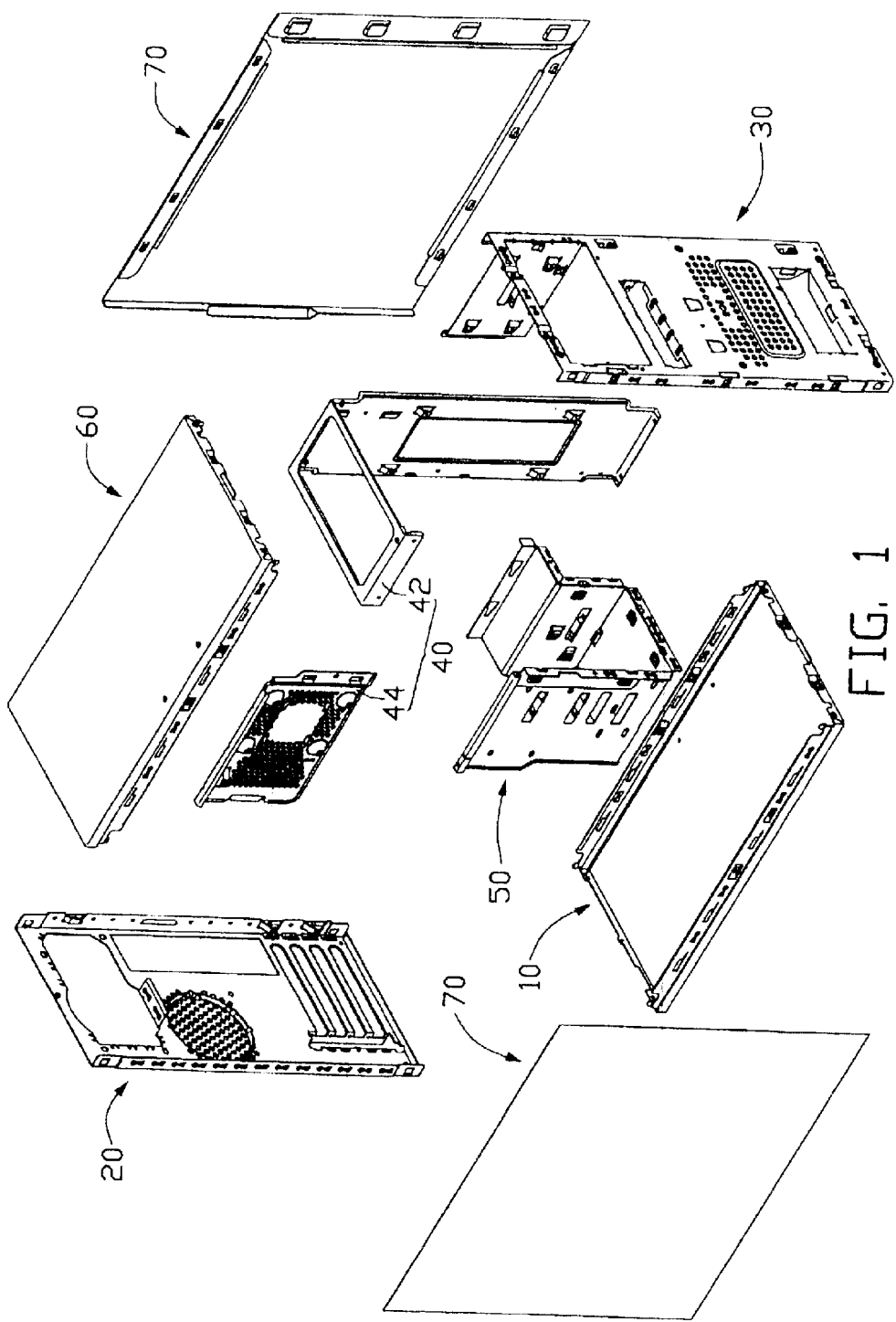
FIG. 1 is an exploded isometric view of a computer enclosure in accordance with the present invention.

FIG. 1 of the attached drawings shows a computer enclosure in accordance with the present invention. The computer enclosure comprises a bottom panel 10, a rear panel 20, a front panel 30, a support frame 40, a storage device bracket 50, a top panel 60, and a pair of left and right side panels 70. The support frame 40 comprises a first support member 42 and a second support member 44.

Figure 2:
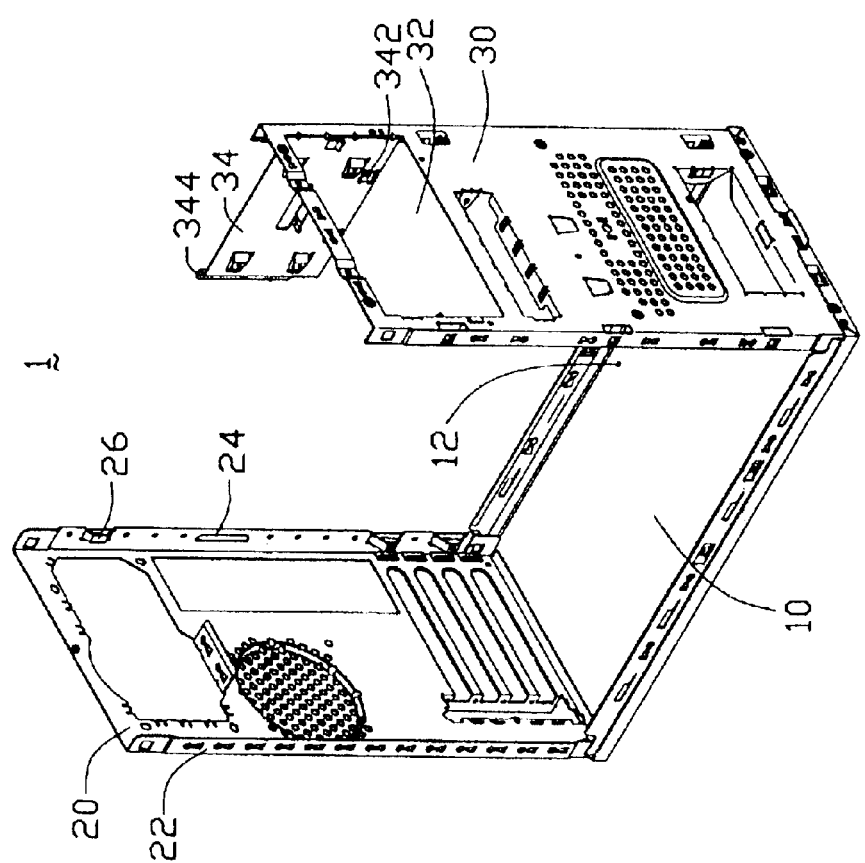
FIG. 2 is an isometric view of a chassis of the computer enclosure of FIG. 1.

Referring to FIG. 2, the bottom panel 10, the rear panel 20 and the front panel 30 cooperatively form a chassis 1. The bottom panel 10 defines a pair of spaced through holes 12 (only one visible) near a right longitudinal side edge thereof. The rear panel 20 comprises a pair of left and right first flanges 22 extending forwardly from respective opposite side edges thereof. An elongate locking slot 24 is defined in the right first flange 22. A plurality of protrusions 26 is inwardly formed from the right first flange 22 by stamping. The front panel 30 defines a rectangular opening 32 in an upper portion thereof. An extension plate 34 extends rearwardly from the front panel 30 at a right side of the opening 32. A pair of horizontally spaced locking tongues 342 is outwardly formed from a bottom portion of the extension plate 34. A locking strip 344 is outwardly bent from a distal edge portion of the extension plate 34.

Referring also to FIGS. 3A-3B, the first support member 42 is generally L-shaped, and comprises a vertical plate 422 and a horizontal plate 424. A first opening 428 is defined in a central portion of the vertical plate 422, for facilitating heat dissipation from a motherboard (not shown) installed in the computer enclosure. A plurality of spaced protrusions 421 is inwardly formed from the vertical plate 422 near respective corners of the first opening 428. A pair of vertically spaced locking splits 425 is defined in a rear portion of the vertical plate 422, between the first opening 428 and a rear edge of the vertical plate 422. A pair of vertically spaced fasteners 427 is inwardly formed from an upper front portion of the vertical plate 422, corresponding to the locking strip 344 of the front panel 30. A bent strip 426 is bent inwardly from a bottom edge portion of the vertical plate 422. A pair of spaced through holes 429 is defined in the bent strip 426, corresponding to the through holes 12 of the bottom panel 10. The horizontal plate 424 extends inwardly from a top edge of the vertical plate 422. A second opening 432 is defined in the horizontal plate 424, for facilitating heat dissipation from the motherboard (not shown). A first bent plate 423 depends from a distal edge of the horizontal plate 424. A pair of spaced through holes 436 is defined in the first bent plate 423. A through hole 434 is defined in a front corner of the horizontal plate 424 near the bent plate 423.

The second support member 44 is a rectangular plate. A height of the second support member 44 is much less than a corresponding height of the motherboard (not shown). A pair of vertically spaced first inserting tabs 442 is outwardly formed from a front end of the second support member 44, corresponding to the locking splits 425 of the first support member 42. A second inserting tab 444 is formed at a rear edge of the second support member 44, corresponding to the locking slot 24 of the rear panel 20. A plurality of spaced standoffs 446 is inwardly formed from the second support member 44.

Referring also to FIGS. 4A-4B, the storage device bracket 50 comprises a bottom plate 53, a first side plate 52 and a second side plate 54. A distal portion of the second side plate 54 is outwardly bent at a right angle, such that a profile of the second side plate 54 is L-shaped. A top edge portion of the first side plate 52 is rolled generally outwardly to form a rolled beam 522. A through hole 524 is defined in a rear portion of the beam 522. A second bent plate 542 extends upwardly from a free edge of the second side plate 54, parallel to and opposite from the first side plate 52. A pair of spaced locking cutouts 544 is defined in the second bent plate 542, for engagingly receiving the locking tongues 342 of the front panel 30.

Referring to FIGS. 5A-5B, the top panel 60 is symmetrical with the bottom panel 10 of the chassis 1. The top panel 60 comprises a pair of second flanges 63 depending from opposite side edges thereof respectively. A pair of through holes 67 is defined in each second flange 63. A plurality of locking slots 64 is defined in each second flange 63. A pair of through holes 65 is defined in the top panel 60 near a left longitudinal side edge thereof.

Figures 6A, 6B:
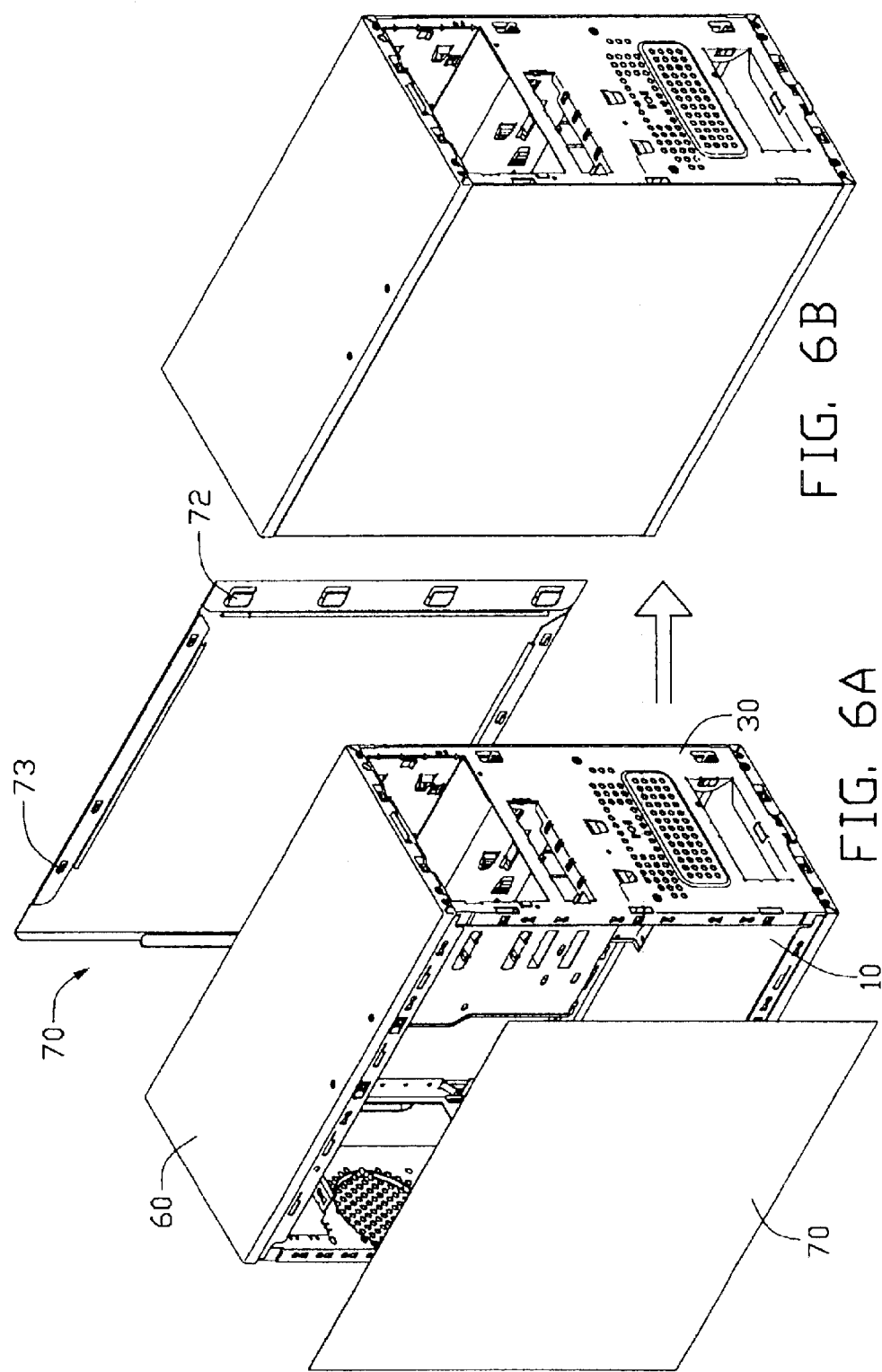

Referring to FIGS. 6A-6B, the side panels 70 are symmetrical with each other. Each side panel 70 comprises a plurality of aligned latches 72 inwardly formed along a front edge portion thereof, and a plurality of aligned hooks 73 inwardly formed along a top edge portion thereof corresponding to the locking slots 64 of the top panel 60.

Referring to FIGS. 3A-6B, in assembly, the first support member 42 is attached to the chassis 1. The locking strip 344 of the extension plate 34 is retained by the fasteners 427 of the first support member 42. A pair of rivets (not shown) is extended through the through holes 429, 12 of the bent strip 426 and the bottom panel 10 to rivet the bent strip 426 and the bottom panel 10 together. The second support member 44 is attached to the first support member 42 and the rear panel 20. The first inserting tabs 442 of the second support member 44 are inserted into the locking splits 425 of the first support member 42. The second inserting tab 444 of the second support member 44 is inserted in the locking slot 24 of the rear panel 20. The storage device bracket 50 is attached to the chassis 1. The locking tongues 342 of the chassis 1 are engaged in the locking cutouts 544 of the storage device bracket 50. A distal end of the horizontal plate 424 of the support frame 40 is supported on the beam 522 of the storage device bracket 50. A rivet (not shown) is extended through the through hole 434 of the support frame 40 and the through hole 524 of the storage device bracket 50 to rivet the horizontal plate 424 and the beam 522 together. The top panel 60 is attached on the chassis 1. Rivets (not shown) are extended through the through holes 67 of the top panel 60 and the through holes 436 of the first support member 42 to rivet the second flange 63 and the first bent plate 423 together. The side panels 70 are attached to opposite sides of the chassis 1. The latches 72 of the side panels 70 are engaged with opposite side flanges (not labeled) of the front panel 30, respectively. The hooks 73 of the side panels 70 are engaged in the locking slots 64 of the top panel 60, respectively. Assembly of the computer enclosure is thus completed.

In the computer enclosure of the present invention, the protrusions 421 of the first support member 42, the standoffs 446 of the second support member 44 and the protrusions 26 of the rear panel 20 cooperatively support the motherboard (not shown) installed in the computer enclosure. The first and second openings 428, 432 of the first support member 42 facilitate heat dissipation from the motherboard. The height of the second support member 44 is much less than the corresponding height of the motherboard. Thus, material is saved in manufacture of the computer enclosure.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A computer enclosure comprising:
   a chassis comprising a bottom panel, a front panel and a rear panel, and a extension plate extending rearward from the front panel; and
   a support frame for supporting a motherboard in the enclosure, the support frame comprising separately formed first and second support members, the first support member being secured with the bottom panel and the extension plate, the second support member being secured between the first support member and the rear panel, a plurality of protrusions being provided on the first support member and a plurality of standoff being provided on the second member for cooperatively supporting the motherboard thereon; wherein the rear panel comprises a first flange extending forward from one side edge thereof, the first flange defines a locking slot, and the second support member forms a second inserting tab engaging in the locking slot.

2. The computer enclosure as claimed in claim 1, wherein the first support member is generally L-shaped, and comprises a horizontal plate spaced from and parallel to the bottom plate, and a vertical plate on which the protrusions are provided.

3. The computer enclosure as described in claim 2, wherein the vertical plate of the first support member defines a plurality of locking splits, and the second member forms a plurality of first inserting tabs engagingly received in the locking splits, respectively.

4. The computer enclosure as described in claim 1, wherein the first flange provides a plurality of protrusions for supporting the motherboard thereon.

5. The computer enclosure as described in claim 2, wherein the vertical plate of the first support member forms a plurality of fasteners, and the extension plate forms a locking strip engaging with the fasteners.

6. The computer enclosure as described in claim 2 further comprising a storage device bracket, wherein the storage device bracket comprises a first side plate on which the horizontal plate of the first support member is supported, and a second side plate engaging with the extension plate.

7. The computer enclosure as described in claim 6, wherein a top portion of the first side plate is rolled to form a rolled beam, and a through hole, is defined in the horizontal plate of the first support member and in the beam for extension of a fastener therethrough to fasten the horizontal plate and the first side plate together.

8. The computer enclosure as described in claim 2, wherein a bent plate depends from a distal edge of the, horizontal plate of the first support member, the computer enclosure further comprises a top flange depending therefrom, and through holes are defined in the bent plate and in the flange for extension of fasteners therethrough to fasten the bent plate and flange together.

9. The computer enclosure as described in claim 2, wherein the vertical plate forms a bent strip at a bottom edge thereof, and through holes are defined in the bent strip and in the bottom panel for extension of fasteners therethrough to fasten the bent strip and the bottom panel together.

10. The computer enclosure as described in claim 2, wherein an opening is defined in each of the horizontal plate and the vertical plate, for facilitating dissipation of heat from the mother board.

11. The computer enclosure as described in claim 2, wherein openings are defined in the horizontal plate and the vertical plate respectively for facilitating heat dissipation of the motherboard.

12. The computer enclosure as described in claim 2, wherein a size of the second support member is substantially less than a size of the motherboard.

13. A computer enclosure comprising:
   a chassis comprising a bottom panel, a front panel and a rear panel;
   a top panel covered on the chassis;
   a support member for supporting a motherboard in the chassis, the support member comprising separately formed first and second support members, the second support member being secured between the first support member and the rear panel, a plurality of protrusions being provided on the first support member and a plurality of standoff being provided on the second member for cooperatively supporting the motherboard thereon; and
   a storage device bracket secured in the chassis, the storage device bracket comprising a first side plate supporting the first supporting member.

14. The computer enclosure as described in claim 13, wherein the first support member comprises a horizontal plate supported on the first side plate of the storage device bracket, and vertical plate engaged in the bottom panel of the chassis.

15. The computer enclosure as described in claim 14, wherein a bent plate depends from a distal edge of the horizontal plate of the first support member, a flange depends from the top panel, and through holes are defined in the bent plate and in the flange for extension of fasteners therethrough to fasten the bent plate and flange together.

16. The computer enclosure as described in claim 14, wherein the vertical plate of the first support member defines a plurality of locking splits, and the second support member forms a plurality of inserting tabs engagingly received in the locking spits, respectively.

17. The computer enclosure as described in claim 14, wherein the vertical plate of the first support member forms a plurality of fasteners, the front panel of the chassis forms an extension plate extending rearward therefrom, and the extension plate forms a locking strip engaging with the fasteners.

18. A computer enclosure comprising:
   a chassis including opposite front and rear panel, and a side panel perpendicular to both side front and rear panel;
   an extension plate directly stamped rearwardly from the front panel and extending toward the rear panel and parallel to the side panel;
   an opening formed in the front panel due to remove of said extension plate therefrom;
   a mother board support frame located beside the extension plate and including fastening means attached to a rear edge of the extension plate; and
   a drive bracket supportably attached to said extension plate and cooperating with said extension plate to define a space in alignment with said opening in a front-to-back direction to allow usage of corresponding drives.

19. The computer enclosure as described in claim 18, wherein said motherboard support frames is of an b-shaped configuration, and the drive bracket is of a U-shaped configuration with a step thereof.

* * * * *